US006018858A

United States Patent [19]

Taylor

[11] Patent Number: 6,018,858

[45] Date of Patent: Feb. 1, 2000

[54] METHOD AND APPARATUS FOR SEPARATING LAYERED MATERIAL

[76] Inventor: Richard R. Taylor, 7316 E. 81st Pl., Tulsa, Okla. 74133

[21] Appl. No.: 09/138,167

[22] Filed: Aug. 21, 1998

[51] Int. Cl.[7] .................. B23P 19/00

[52] U.S. Cl. .................. 29/426.5; 29/239; 29/254

[58] Field of Search .................. 29/426.5, 239, 29/254; 156/344, 584

[56] References Cited

U.S. PATENT DOCUMENTS

| | | | |
|---|---|---|---|
| 1,381,890 | 6/1921 | Brouhard . | |
| 1,800,384 | 4/1931 | Haack . | |
| 2,616,664 | 11/1952 | Warner | 254/113 |
| 3,280,455 | 10/1966 | Smith | 29/254 |
| 3,568,657 | 3/1971 | Gue | 125/40 |
| 4,433,463 | 1/1984 | DuVal | 29/239 |
| 4,518,151 | 5/1985 | Dill, Jr. | 254/93 |
| 5,232,202 | 8/1993 | Watson . | |

*Primary Examiner*—P. W. Echols
*Assistant Examiner*—John C. Hong
*Attorney, Agent, or Firm*—Gardere & Wynne, L.L.P.; Lawrence R. Watson

[57] ABSTRACT

An apparatus for separating layers comprising a stack of material includes an elongate blade having a relatively sharp distal end, a handle pivotally supported at the proximal end of the blade, and a hammer supported on the handle for striking the proximal end of the blade to drive the blade between selected layers comprising the stack of material. After the blade has been inserted between the selected layers to a predetermined extent, the handle is pivoted into a perpendicular orientation relative to the blade and is utilized to pivot the blade through an arc of 90 degrees, thereby separating the selected layers of material to permit the insertion of a spacer therebetween. The foregoing steps are repeated until the selected layers of material have been fully separated.

6 Claims, 2 Drawing Sheets

METHOD AND APPARATUS FOR SEPARATING LAYERED MATERIAL

TECHNICAL FIELD

This invention relates generally to the separation of layers of material comprising a stack thereof to facilitate further handling, and more in particularly to a method of and apparatus for separating predetermined layers comprising a stack of lumber in such a way as to facilitate further handling of the lumber utilizing a forklift truck or similar apparatus.

BACKGROUND AND SUMMARY OF THE INVENTION

In order to facilitate handling utilizing forklift trucks and similar apparatus, many types and kinds of materials are configured in stacks for transportation to job sites, manufacturing facilities, etc. The layers comprising a stack of material are layed flat together without any space between layers which leads to difficulties in the further handling of the material comprising the stack. This is particularly true in the case of stacks of lumber wherein the further handling of the lumber utilizing forklift trucks, etc. is nearly impossible.

Various devices have heretofore been proposed for separating layers comprising stacks of materials, most of which require the layers to have a space between them before they can operate. For the most part, the prior art devices designed for this purpose have been expensive to purchase and use and cumbersome to operate. Thus, a need exists for a device for separating the layers comprising a stack of material which is straightforward in design and therefore economical to purchase and use and which is likewise straightforward in its utilization.

The present invention comprises a method of and apparatus for separating layers of stacked material which fulfills the foregoing and other requirements which have long since been found lacking in the prior art. In accordance with the broader aspects of the invention, an apparatus for separating layers of stacked material comprises an elongate blade having a relatively sharp distal end and a handle pivotally connected to its proximal end. A hammer is slidably supported on the handle for manual actuation to impact the proximal end of the blade. A handle grip is provided at the distal end of the handle and a spring clip is provided for securing the hammer when not in use.

In accordance with the method of the invention, the relatively sharp distal end of a blade is positioned between selected layers comprising a stack of material and the handle is oriented parallel to the blade. The hammer is manually actuated to repeatedly strike the proximal end of the blade, thereby driving the blade between the layers of the material. When the blade has penetrated a sufficient distance, the handle is pivoted into a perpendicular orientation relative to the blade and it is utilized to pivot the blade through an arc of approximately 90 degrees, thereby separating the layers of material. A spacer is positioned between the separated layers and the process is repeated until the layers are separated sufficiently to facilitate further handling of the material comprising the stack utilizing a forklift truck or similar apparatus.

BRIEF DESCRIPTION OF THE DRAWINGS

A more complete understanding of the invention may be had by reference to the following Detailed Description when taken in conjunction with the accompanying Drawings, wherein.

DETAILED DESCRIPTION

Figure 1:
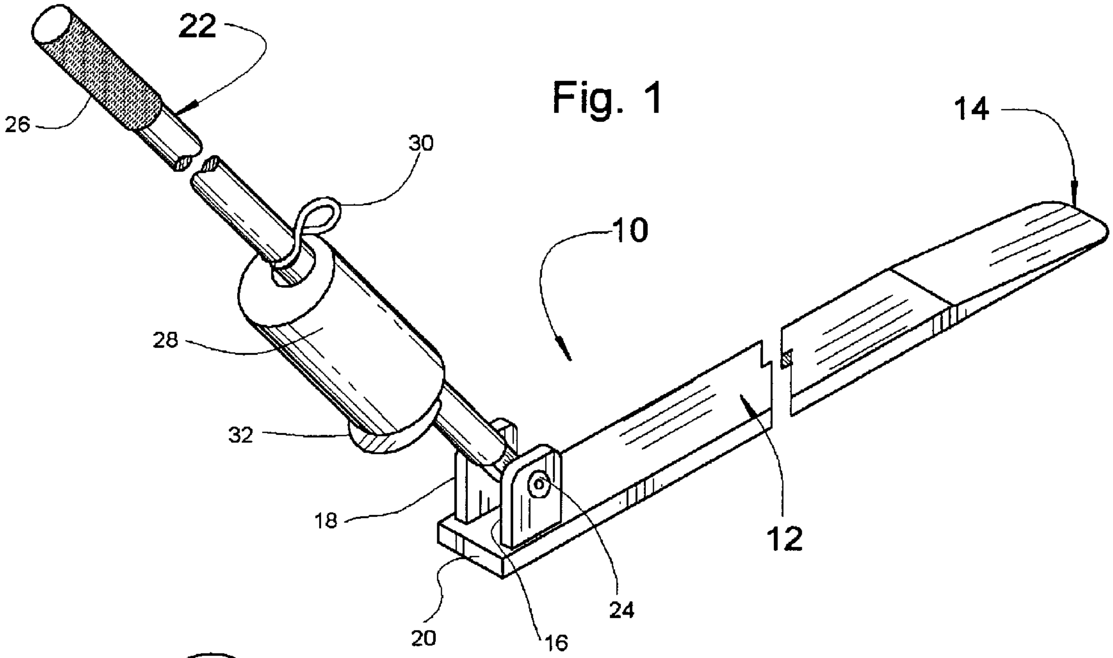
FIG. 1 is a perspective view of an apparatus for separating layers of stacked material incorporating the preferred embodiment of the invention.

Referring now to the Drawings, and particularly to FIG. 1 thereof, there is shown an apparatus for separating layers of stacked material 10 comprising the preferred embodiment of the invention. The apparatus 10 includes a blade 12 having a relatively sharp distal end 14. A pair of handle mounts 16 and 18 are located at the proximal end of 20 of the blade 12 and are secured thereto utilizing suitable fasteners or by welding.

A handle 22 is secured to the blade 12 at the proximal end 20 thereof and is supported for pivotal movement relative to the blade by a fastener 24 which extends through the handle mounts 16 and 18 and through an aperture formed in the handle 22. A handle grip 26 is provided at the distal end of the handle 22. A hammer 28 is slidably supported on the handle, and a spring clip 30 is provided for securing the handle in place when not in use.

Figure 2:
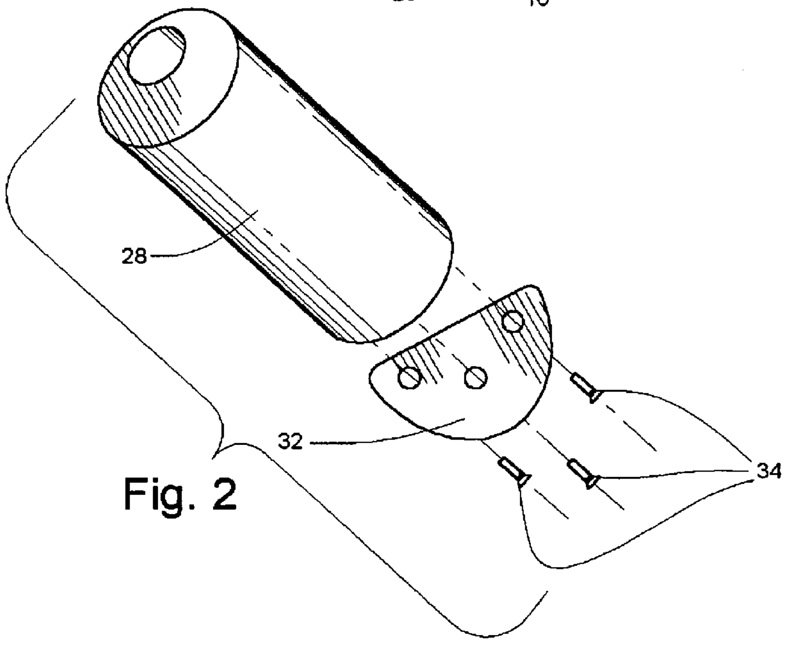
FIG. 2 is an exploded view illustrating the hammer of the apparatus of FIG. 1.

Referring to FIG. 2, the hammer 28 is shown in greater detail. The hammer 28 is provided with a finger guard 32 which is secured to the hammer 28 utilizing suitable fasteners 34, or by welding. Referring again to FIG. 1, the finger guard 32 is located at the end of the hammer 28 opposite from the location of the handle grip 26 relative thereto.

Figure 3:
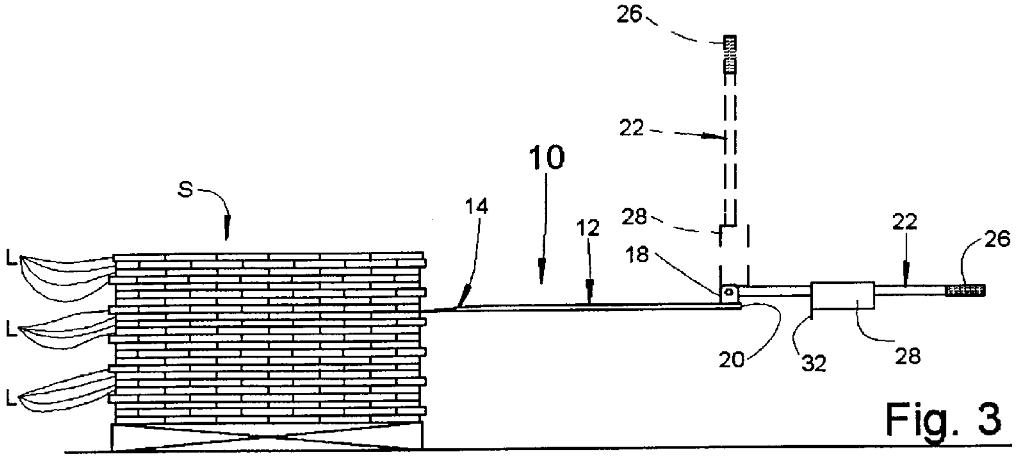
FIG. 3 is an illustration of the use of the apparatus of the FIG. 1 in a first step in the practice of the method of the invention.
Figure 4:
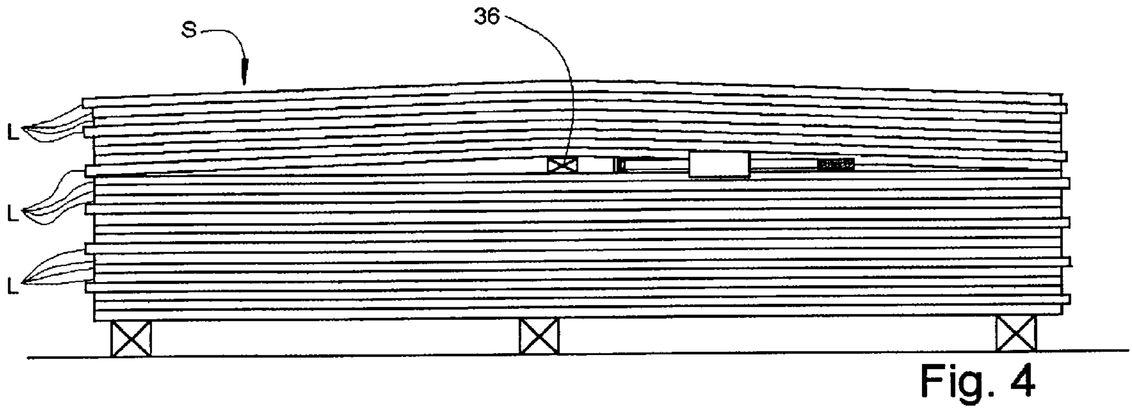
FIG. 4 is an illustration of a later step in the method of the invention.
Figure 5:
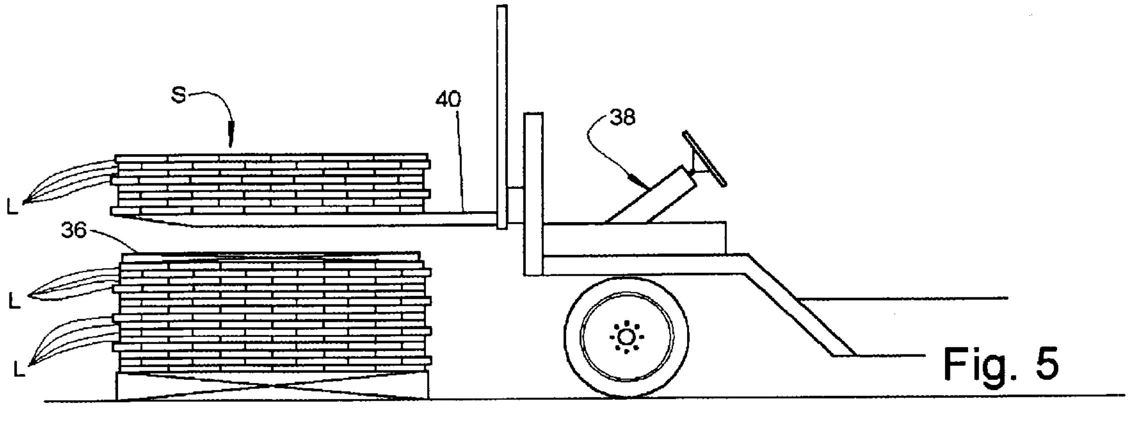
FIG. 5 is an illustration of a still later step in the method of the invention.

Referring to FIGS. 3, 4, and 5, the present invention further comprises a method of separating layers of material comprising a stack thereof utilizing the apparatus 10 of FIGS. 1 and 2. Referring particularly to FIG. 3, there is shown a stack of material S comprising a multiplicity of layers L stacked one on another. The particular stack of material S illustrated in FIG. 3 comprises layers of lumber, however, it will be understood that the invention may also be utilized to separate layers comprising other types and kinds of material.

The first step in the method of the invention comprises the insertion of the relatively sharp distal end 14 of the blade 12 between selected layers L comprising the stack of material S. The handle 22 is initially pivoted relative to the blade 12 until it extends parallel to thereto as shown in FIG. 3. After the blade 12 is properly positioned, the spring clip 30 is removed and the hammer 28 is manually reciprocated back and forth into engagement with the proximal end 20 of the blade 12. This action drives the tip 14 of the blade 12 between the selected layers L comprising the stack of material S.

After the blade 12 has penetrated between the selected layers L comprising the stack of material S a predetermined distance, the handle 22 is pivoted upwardly relative to the blade 12 until it is oriented as shown in dashed lines in FIG. 3. During pivotal movement of the handle 22, the spring clip 30 may be utilized to secure the hammer 28 in place. After it has been pivoted upwardly, the hammer 22 is utilized to pivot the blade 12 through an arc of 90 degrees. At this point the component parts of the apparatus 10 are situated as illustrated in FIG. 4.

Pivotal movement of the blade 12 of the apparatus 10 following penetration thereof under the action of the hammer 28 striking the proximal end 20 of the blade 12 forms a space between the selected layers L of the stack of material S as illustrated in FIG. 4. A spacer 36 is positioned in the space thus created and is moved inwardly between the layers L comprising the stack of material S as far as possible. Thereafter the handle 22 is returned to the position illustrated in dashed lines in FIG. 3 and is then pivoted downwardly until it is oriented as illustrated in full lines in FIG. 3. The hammer 28 is once again impacted with the proximal end 20 of the blade 12, thereby driving the distal end 14 of the blade 12 further into the space between the selected layers L of the stack of material S. The process is repeated until the spacer 36 has been extended completely through the stack of material S.

After the spacer 36 has been inserted completely through the stack of material S, the apparatus 10 of the present invention is withdrawn. Referring to FIG. 5, a forklift truck 38 or other, similar apparatus is utilized to position a pair of forks 40 in the space thus created. Preferably, the forks 40 are positioned on opposite sides of the spacer 36 and are extended entirely through the stack of material S. The forklift truck 38 or other, similar apparatus is then utilized to raise the pair of forks 40, whereupon the layers L comprising the upper portion of the stack of material S are removed for further handling.

Although preferred embodiments of the invention have been illustrated in the accompanying Drawings and described in the foregoing Detailed Description, it will be understood that the invention is not limited to the embodiments disclosed, but is capable of numerous rearrangements, modifications, and substitutions of parts and elements without departing from the spirit of the invention.

I claim:

1. An apparatus for separating layers of stacked material comprising:

an elongate, flat blade having a relatively sharp distal end;

a handle;

support members securing the handle to the proximal end of the blade and supporting the handle for pivotal movement relative to the blade between a first position wherein the handle extends parallel to the blade and a second position wherein the handle extends perpendicularly to the blade; and a hammer slidably supported on the handle for impact engagement with the proximal end of the blade when the handle is in the first position to drive the blade between selected layers comprising the stack of material.

2. The apparatus according to claim 1 further including a handle grip mounted on the distal end of the handle for selective actuation to first pivot the handle relative to the blade and thereafter for selective actuation to pivot the handle and the blade relative to the stack of material.

3. The apparatus according to claim 2 further including a retaining member for selective engagement with the handle to retain the hammer in place.

4. A method of separating layers comprising a stack of materials including the steps of:

providing a flat blade having a width substantially greater than its thickness;

pivotally supporting a handle at the proximal end of the blade;

slidably supporting a hammer on the handle;

driving the blade between selected layers comprising a stack of material until the blade is penetrated between the layers a predetermined distance by repeatedly striking the hammer against the proximal end of the blade;

thereafter pivoting the handle and the blade through an arc of 90 degrees thereby opening a space between the selected layers comprising the stack of materials.

5. Method of claim 4 further comprising the step of:

positioning a spacer in the space opened by pivoting the handle and blade.

6. Method of claim 4 further comprising the step of:

repeating the driving, pivoting, and positioning steps until the selected layers comprising the stack of material have been separated to a selected extent.

* * * * *